United States Patent [19]

Allen

[11] Patent Number: 4,817,422
[45] Date of Patent: Apr. 4, 1989

[54] TONE INJECTED NACELLE FOR AEROACOUSTIC WIND TUNNEL TESTING

[75] Inventor: Richard M. Allen, Enumclaw, Wash.

[73] Assignee: The Boeing Company, Seattle, Wash.

[21] Appl. No.: 107,675

[22] Filed: Oct. 13, 1987

[51] Int. Cl.$^4$ .................... G01M 9/00; G01M 15/00
[52] U.S. Cl. .................... 73/147; 73/117.1; 73/571; 73/865.6
[58] Field of Search ........... 73/116, 147, 571, 865.6, 73/117.1, 117.4, 118.1

[56] References Cited

U.S. PATENT DOCUMENTS

| | | | |
|---|---|---|---|
| 3,015,231 | 1/1962 | Ganahl et al. | 73/116 |
| 3,107,525 | 10/1963 | Murray | 73/116 |
| 3,225,589 | 4/1961 | Spangler, Jr. et al. | 73/35 |
| 3,434,679 | 5/1966 | Kutney et al. | 244/53 |
| 3,893,335 | 7/1975 | Johnson et al. | 73/147 |
| 4,034,604 | 7/1977 | Decher et al. | 73/147 |
| 4,534,216 | 8/1985 | Fasano et al. | 73/147 |
| 4,574,632 | 3/1986 | Woolley et al. | 73/571 |

OTHER PUBLICATIONS

J. Lepicovsky, K. K. Ahuja, M. Salikudden, An Experimental Study of Tone Excited Heated Jets, AIAA Journal, AIAA-84-2341, 1984.
H. Y. Lu, Effect of Excitation on Coaxial Jet Noise, AIAA Journal, vol. 21, No. 2, p. 214.
K. K. Ahuja, J. Lepicovsky, R. H. Burrin, Noise and Flow Structure of a Tone-Excited Jet AIAA Journal, vol. 20, No. 12, p. 1700.

Primary Examiner—Donald O. Woodiel
Attorney, Agent, or Firm—Hughes, Cassidy & Multer

[57] ABSTRACT

An aeroacoustical test apparatus for evaluating a component. The apparatus includes a primary exhaust generating means which detects a primary gaseous flow through a primary passageway and out the primary nozzle. The apparatus further includes a secondary bypass flow generating means which directs bypass flow through a bypass passageway and out the secondary nozzle. An acoustical energy generating means having a sound transmitting axis is substantially centered on the longitudinal center axis of the apparatus. The acoustical energy generating means projects acoustical energy through a first centrally located acoustical coupler and a plurality of secondary acoustical couplers which extend around the primary exhaust generating means and into the secondary bypass passageway to cause the acoustical energy to exit from the secondary nozzle. Acoustical energy is generated by the acoustical energy generating means and acoustical energy flows into the first acoustical coupler and expands as it goes into the plurality of secondary acoustical couplers and expands further as it goes into the annular bypass passageway. The introduction of acoustical energy into the air in the annular bypass passageway results in the generation in that passageway of fan noise which would be created in the bypass duct of a jet engine employing the nozzle assembly being tested under actual operating conditions. A method for evaluating a component is also disclosed.

20 Claims, 3 Drawing Sheets

TONE INJECTED NACELLE FOR AEROACOUSTIC WIND TUNNEL TESTING

BACKGROUND OF THE INVENTION (a) Field of the Invention

This invention relates generally to the field of Aeroacoustical Wind Tunnel Testing for jet engine nozzle assembly noise level evaluation and in particular to a tone injected nacelle for such testing.

(b) Background of the Invention

Excess jet noise is a phenomenon in which a jet engine internal noise, such as a fan tone, can excite the exhaust jet to produce a significant increase in the broadband jet noise spectrum. This effect must be taken into consideration to establish accurate jet noise prediction procedures, which have generally in the past been based on noise measurements of "clean" laboratory jets, and, consequently, have tended to underpredict real jet engine noise.

Applicant's assignee has heretofore developed an aeroacoustical test apparatus for making such predictions which positions a plurality of high frequency acoustical drivers around the primary and secondary flow ducts of a jet engine to simulate internal noise sources. A typical high by-pass ratio jet engine is known to have internal noise radiation out of both the core (primary) and fan (secondary) nozzles. It has been found that while acoustical excitations in the primary duct produced modest excess jet noise, acoustical excitation in the secondary duct can generate significant excess jet noise and hence acoustical excitation in the secondary duct is most effective in jet noise amplification so that acoustical drivers have been used to direct noise laterally into the secondary duct Previously, the acoustical drivers have been positioned radially around the secondary duct in order to direct the noise laterally, into the secondary or bypass duct This approach has a number of disadvantages in that the positioning of acoustical drivers at the primary and secondary flow ducts have yielded a large configuration with poor aerodynamics which could only be used in the static environment of a large test chamber so that further testing was needed in wind tunnels to determine effects of excess jet noise.

SUMMARY OF INVENTION

The present invention provides a compact, streamlined aeroacoustical testing apparatus for jet engine nozzle assembly noise level evaluation which can be used in a smaller wind tunnel with the minimum flow disturbance necessary for accurate noise prediction.

The aeroacoustical testing apparatus has a primary exhaust generating means which directs a primary flow of hot gases through a primary passageway and out a primary nozzle. The aeroacoustical testing apparatus further has secondary bypass flow generating means which directs a secondary flow of heated gases through an annular bypass and out a secondary nozzle. An acoustical energy generating means is centered on the longitudinal center axis of the apparatus. The acoustical energy generating means projects acoustical energy waves through a first centrally located acoustical coupler and a plurality of secondary acoustical couplers which surround the primary exhaust generating means into the secondary bypass to cause the acoustical energy to exit from the secondary nozzle. Acoustical energy generated by the acoustical energy generating means expands as it passes through the first and secondary acoustical couplers and expands further as it is injected into the annular bypass, thereby simulating the noise from a jet engine bypass fan. The present invention uses a single acoustical generator which is positioned adjacent the forward end of the primary exhaust generating means. The acoustical generator has a primary sound propagating axis along which the acoustical energy is transmitted, and that axis is substantially a continuation of the longitudinal center axis of the apparatus. As acoustical energy is transmitted substantially along the longitudinal center axis of the apparatus and does not have to turn corners, the single acoustical generator of the present invention provides greater acoustical power output and efficiency than originally achieved with a plurality of acoustical drivers positioned to inject sound laterally into the bypass duct.

It is an object and advantage of the present invention to provide an aeroacoustical test apparatus having increased acoustical power and efficiency and therefore increased acoustical output for testing jet engine nozzle assemblies for high by-pass ratio noise levels in low speed wind tunnels.

Another object and advantage of the present invention is to provide an aeroacoustical test apparatus which is easier to use in testing jet engine noise than present testing apparatus.

Still another object and advantage of the present invention is to provide an aeroacoustical test apparatus which is less costly to construct than previous testing apparatus.

Still yet another object and advantage of the present invention is to provide an aeroacoustical test apparatus which will more accurately simulate sound which a jet engine could be expected to generate under service conditions than previously accomplished.

These and other objects and advantages of the present invention will become apparent after a review of the drawings and a study of the description of the preferred embodiment

DETAILED DESCRIPTION OF THE INVENTION

Figure 1:
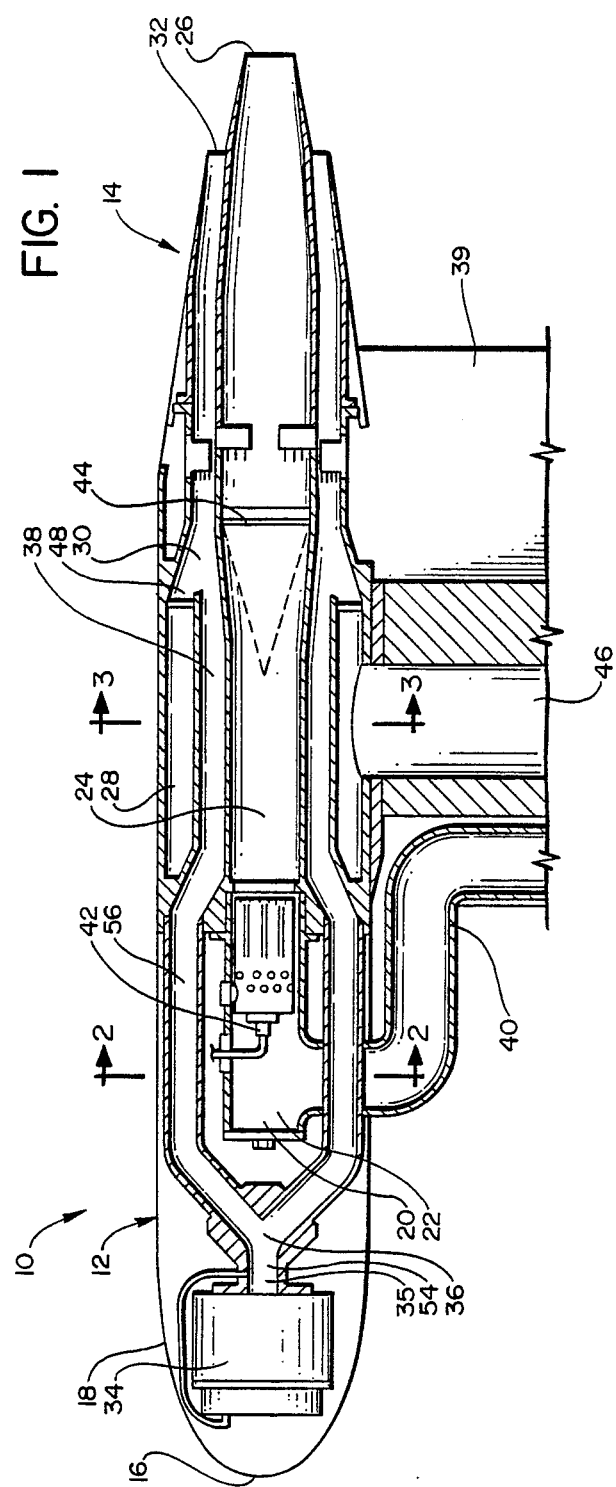
FIG. 1 is a sectional view taken through the longitudinal center axis of the aeroacoustical testing apparatus constructed in accordance with and embodying the principles of the present invention.

Referring now to the drawings, FIGS. 1-4 depict aeroacoustical test apparatus 10 which is constructed in accordance with the principles of the present invention. Test apparatus 10 has a forward or upstream end 12, a rear or downstream end 14, and a longitudinal center axis 16. The aeroacoustical testing apparatus has a nacelle 18 positioned around, and substantially aligned with, its longitudinal center axis 16. It also has a primary exhaust generating means 20 having a forward upstream end 22 and defining a generally longitudinally extending primary passageway 24 which communicates with the primary exhaust nozzle 26 being evaluated and a primary exhaust nozzle 26. The primary exhaust generating means 20 is positioned in the nacelle 18 and is arranged to direct a primary gaseous flow through the primary passageway 24 and out the primary exhaust nozzle 26.

Aeroacoustical testing apparatus 10 further has a secondary bypass flow generating means 28 positioned around the primary exhaust generating means 20 and defining an annular bypass passageway 30 which surrounds the primary passageway 24 and communicates with the secondary nozzle 32 of the nozzle assembly being evaluated. The secondary bypass flow generating means 28 is arranged to direct bypass flow through the bypass passageway 30 and out the secondary nozzle 32.

Acoustical energy generating means in the form of a loudspeaker driver 34 is centered on the longitudinal center axis 16 of testing apparatus 10 upstream from the forward end 22 of the primary exhaust generating means 20. The loudspeaker driver 34 has a primary sound propagating axis 35 along which acoustical energy from the loudspeaker driver 34 is primarily transmitted Sound propagating axis 35 extends rearwardly from the loudspeaker driver 34, and it is substantially a continuation of the longitudinal center axis 16 of the apparatus 10. A sound passageway means 36 leads in a substantially longitudinal direction from the loudspeaker driver 34 to the annular bypass passageway 30, for the secondary or bypass flow, and acoustical energy generated by loudspeaker driver 34 is therefore injected into a sound injection annulus 38 positioned between the secondary bypass flow generating means 28 and bypass passageway 30, and caused to flow through and exit from the secondary nozzle 32 being evaluated.

The foregoing structure is supported from any convenient surface by support strut 39. As seen in FIG. 1 the primary exhaust generating means 20 has a primary passageway 24. In operation, air is injected into the primary air inlet 40 and heated by heating means in the form of a propane burner 42, thereby creating a primary exhaust which simulates the jet exhaust created in the primary duct of a jet engine under operating conditions. The primary exhaust generating means 20 is positioned in the nacelle 18 and directs the primary exhaust through primary passageway 24 and out of the primary exhaust nozzle 26.

In the preferred form, the primary exhaust generating means 20 further includes a primary back pressure means in the form of a primary back pressure plate or plug 44. In order to make the aeroacoustical testing apparatus 10 as compact as possible, it is preferred to use a small propane burner 42. The primary back pressure plate 44 makes the smaller burner 42 work by providing increased air density at the burner 42; this results in a proportional increase in the mass flow through the primary nozzle 26 at the same flow velocity but with reduced pressure through the primary exhaust generating means 20. The primary back pressure plate 44 also blocks out much of the noise which would otherwise be generated from the burner 42 so that the sound deliberately generated by the loudspeaker driver 34 is not distorted with noise from the burner 42. In the illustrated testing apparatus 10, the primary back pressure plate 44 is a disc of "Poroplate" which is a propriety material composed of several layers of stainless steel screen which have been fused under heat and pressure.

The gases introduced into the annular bypass passageway 30 of test apparatus 10 are externally heated (typically to about 150° F.) and the secondary bypass flow generating means 28 directs the externally heated bypass flow through the annular bypass passageway 30 and out the secondary nozzle 32 with the externally heated gases being injected into the secondary air inlet 46 and flowing through the annular bypass passageway 30 and out the secondary nozzle 32. In this way, the secondary bypass flow generating means 28 simulates the fan generated flow that is created in a jet engine under operating conditions.

The secondary bypass flow generating means 28 also includes a secondary back pressure means in the form of a secondary back pressure plate or plug 48. This component is similar to the primary back pressure plate 44 used in the primary exhaust generating means 20. The secondary back pressure plate 48 promotes uniform flow distribution because uniformity of the flow is necessary to simulate that of an actual jet engine. The secondary back pressure plate 48 also reduces upstream velocity sufficiently to eliminate upstream flow noise so that sound deliberately generated by the loudspeaker driver 34 is not distorted with upstream flow noise that may occur in the annular bypass passageway 30

Boundary layer bleed is employed to remove the nacelle boundary layer immediately upstream from the secondary exhaust nozzle 32. The boundary layer gases are bled through a continuous, perforated surface circumnavigating the nacelle 18 and extending a short distance along both sides of the support strut 39.

In the illustrated embodiment of the testing apparatus 10, the sound passageway means 36 comprises a first centrally located primary acoustical coupler 54 which leads into four secondary, also tubular acoustical couplers 56. The four secondary acoustical couplers 56 are positioned equidistantly around and radially outwardly of the forward end 22 of the primary exhaust generating means 20.

Figure 2:
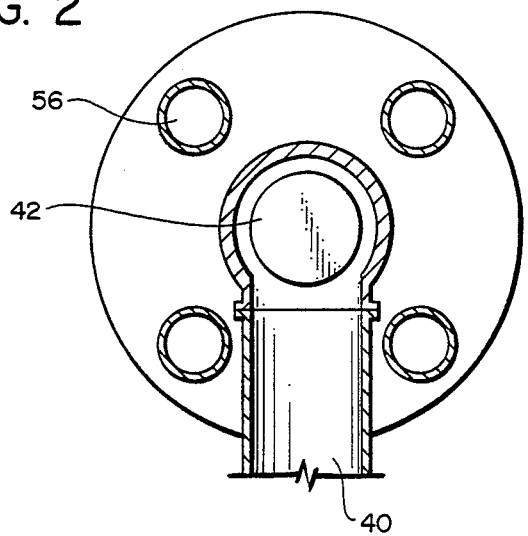
FIG. 2 is a cross-sectional view taken through line 2—2 of FIG. 1 and showing greater detail on certain noise injection tubes employed in the apparatus illustrated in the latter figure.
Figure 3:
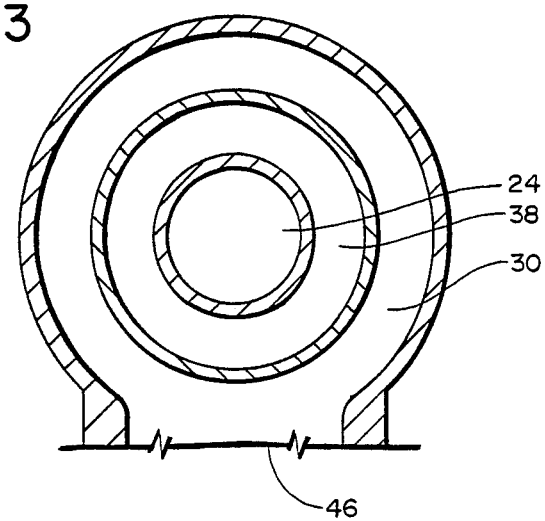
FIG. 3 is a cross-sectional view taken through line 3—3 of FIG. 1 and showing the central portion of the aeroacoustical testing apparatus.

As shown in FIGS. 1 and 2, the sound passageway means 36 is positioned so that acoustical energy from the loudspeaker driver 34 passes through the first centrally located acoustical coupler 54 and then expands into the four secondary acoustical couplers 56, cumulatively the latter 56 have a much larger cross-sectional area than the central acoustical coupler 54. Because it expands into a larger area, no acoustical energy is lost and no echo is generated as there would tend to be if the acoustical energy traveled through the one tube of constant diameter.

The four secondary acoustical couplers 56 communicate with the sound injection annulus 38 and through that annulus with the annular bypass passageway 30 where the acoustical energy expands further. The acoustical efficiency and consequently the acoustical power output of the loudspeaker 34 is increased considerably by the gradual expansion of the acoustical path in the direction of wave propagation.

In addition, the use of four secondary acoustical couplers 56 positioned around and radially outwardly of the upstream end 22 of the primary exhaust means 20 provide symmetrical injection of the acoustical energy into the sound injection annulus 38 and the annular bypass passageway 30 with the acoustical energy waves flowing generally parallel with the secondary flow of heated gases. As stated before, externally heated air is also injected into the annular bypass passageway 30 through the secondary air inlet 46. The introduction of acoustical energy into the air in the annular bypass passageway 30 results in the generation in that passageway of fan noise which would be created in the bypass duct of a jet engine employing the nozzle assembly being tested under actual operating conditions.

The acoustical energy is so injected into the annular bypass passageway 30 that as acoustical waves travel through the annular bypass passageway 30 each wave front travels evenly out of the annular bypass passageway 30 at the same time and the wave front travels evenly out of the secondary nozzle 32 at the same time to provide in-phase acoustical excitation of the gases flowing through at the secondary nozzle 32. This in-phase acoustical excitation ensures uniform distribution of the acoustical energy waves at the secondary nozzle 32 which is necessary to simulate the sound that is generated by an actual jet engine.

Various acoustical testing procedures can be performed with testing apparatus 10 by collecting data at the discharge end of the secondary nozzle 32 where the sound of simulated fan air noise is exiting from the secondary nozzle 32.

Figure 4:
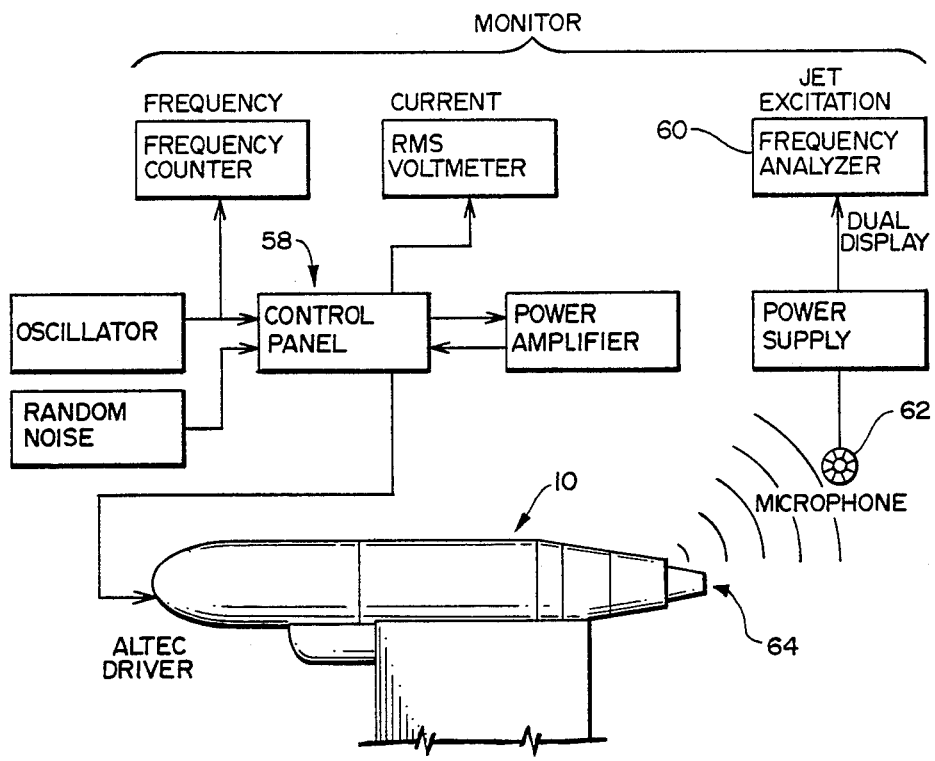
FIG. 4 is a schematic view of the aeroacoustical testing apparatus as it is used in one exemplary test rig.

Referring again to the drawings, FIG. 4 depicts one exemplary test rig which includes: the just described aeroacoustical testing apparatus 10 and controls 58 for controlling the generation of acoustical energy by loudspeaker driver 34. A microphone 62 is located at the rear end 64 of the aeroacoustical testing apparatus 10 to convert to an analog signal the information on noise level and character available at the discharge side of the nozzle assembly being evaluated. The data thus generated or otherwise processed is subjected to frequency analyzer 66 to be evaluated or otherwise processed.

From the foregoing, it can be seen that the applicant's aeroacoustical testing apparatus with its primary exhaust generating means and a secondary bypass flow generating means, sound generating means positioned proximate to the longitudinal center axis of the aeroacoustical testing apparatus, and sound transmitting means leading longitudinally from the sound generating means to a bypass passageway in a manner that directs the sound to the bypass passageway and causes it to exit from the bypass nozzle means provides increased acoustical power and efficiency and therefore increased acoustical output compared to previous testing apparatus. The present aeroacoustical test apparatus is also easier to use and less costly to construct and more accurately simulates the sound which a jet engine could be expected to generate under service conditions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed as the invention is:

1. An aereoacoustical test apparatus for evaluating the sound generated in a component having fluid flowing through an elongated, annular flow passage of the component, the annular flow passage having an upstream end and a downstream end, and the apparatus comprising:
   (a) means for effecting a flow of fluid through the annular flow passage;
   (b) means for acoustically exciting the fluid, thereby simulating sound which the fluid could be expected to generate under service conditions including:
      (i) a single acoustical generator; and
      (ii) a plurality of acoustical coupling means for injecting sound emitted from the acoustical generator into the upstream end of the annular flow passage at predetermined intervals therearound.

2. An aeroacoustical testing apparatus for jet engine nozzle assembly noise level evaluation, the apparatus having a forward upstream end, a rear downstream end, and a longitudinal center axis, and the apparatus comprising:
   (a) a primary exhaust generating means for directing a primary gaseous flow, the means having an upstream end and defining a generally longitudinally extending primary passageway, the primary exhaust generating means being positioned in a nacelle and being arranged to direct a primary gaseous flow through the primary passageway and out the primary nozzle,
   (b) a secondary bypass flow generating means defining an annular bypass passageway surrounding the primary passageway, the secondary bypass flow generating means being arranged to direct bypass flow through the bypass passageway and out the secondary nozzle means,
   (c) a single acoustical energy generating means substantially centered on the longitudinal center axis at a location forwardly of the forward end of the primary exhaust generating means, the acoustical energy generating means having a primary sound propagating axis along which sound from the acoustical energy generating means is primarily transmitted, the sound propagating axis extending rearwardly from the acoustical energy generating means and being substantially a continuation of the longitudinal center axis, and
   (d) acoustical coupling means leading in a substantially longitudinal direction from the sound generating means to the bypass passageway to direct the acoustical energy from the acoustical energy generating means through the bypass passageway and the secondary nozzle means.

3. An apparatus as defined in claim 2, wherein the acoustical coupling means comprises a primary acoustical coupler and a plurality of secondary acoustical couplers positioned around, and radially outwardly of, the upstream end of the primary exhaust generating means.

4. An aeroacoustical test apparatus as defined in claim 2 further comprising:
   (e) means for heating the gases introduced into the primary nozzle.

5. An aeroacoustical test apparatus as defined in claim 2 further comprising:
   (e) means for heating the gases introduced into the secondary nozzle.

6. An aeroacoustical test apparatus as defined in claim 2 further comprising:
   (e) primary back pressure means operatively associated with the primary exhaust generating means for reducing upstream velocities of gaseous flow.

7. An aeroacoustical test apparatus as defined in claim 6 further comprising:
   (f) secondary back pressure means operatively associated with the secondary bypass flow.

8. An aeroacoustical test apparatus as defined in claim 6 or 7 wherein the back pressure means comprises bonded together layers of wire mesh.

9. An aeroacoustical test apparatus as defined in claim 2 wherein the acoustical coupling means has a communicating first and second segments of cross-sectional area, the second segment being larger in cross-sectional area than the first segment so that acoustical energy introduced into the first segment can expand as it passes from the first segment to the second segment.

10. An aeroacoustical test apparatus as defined in claim 2, wherein each acoustical energy wave generated by the acoustical generator passes through the bypass passageway evenly and at one time and each acoustical energy wave passes out of the secondary nozzle evenly and at one time to provide in-phase acoustical excitation of the gases flowing through the secondary nozzle.

11. A method for evaluating a component having an elongated annular flow passage therethrough, the method comprising the steps of:
(a) causing a flow of fluid through the annular passage of the component; and
(b) so acoustically exciting the fluid by injecting acoustical energy from a single acoustical generator thereinto as to simulate noise at a level and of a quality generated in the component being evaluated under service conditions.

12. A method for evaluating an assembly of a primary flow nozzle and a secondary flow nozzle with aeroacoustical testing apparatus having an upstream end, a downstream end and a longitudinal center axis, the method comprising the steps of:
(a) directing a primary gaseous flow through the primary nozzle;
(b) directing a bypass flow through the secondary nozzle; and
(c) transmitting acoustical energy from a single acoustical energy generating means centered on the longitudinal center axis of the component through an acoustical coupling means and through the secondary nozzle and causing the acoustical energy to exit from the secondary nozzle.

13. A method as defined in claim 12 wherein the acoustical coupling means comprises a first acoustical coupler and a plurality of secondary acoustical couplers positioned around and radially outwardly of, the upstream end of the primary exhaust generating means.

14. A method as defined in claim 12 further comprising the step of:
(d) heating the gases introduced into the primary nozzle.

15. A method as defined in claim 12 further comprising the step of:
(d) heating the gases introduced into the secondary nozzle.

16. A method as defined in claim 12 further comprising the step of:
(d) providing back pressure means operatively associated with the primary exhaust generating means to reduce upstream velocities of gaseous flow.

17. A method as defined in claim 16 further comprising the step of:
(e) providing secondary back pressure means operatively associated with the secondary bypass flow.

18. A method as defined in claim 16 or 17 wherein the back pressure means comprises bonded together layers of wire mesh.

19. A method as defined in claim 12 wherein the acoustical generating means has a communicating first and second segments of cross-sectional area, the second segment being larger in cross-sectional area than the first segment so that acoustical energy introduced into the first segment can expand as it passes from the first segment to the second segment.

20. A method as defined in claim 12 wherein each acoustical energy wave generated by the acoustical generator passes through the bypass passageway evenly and at one time and each acoustical energy wave passes out of the secondary nozzle evenly and at one time to provide in-phase acoustical excitation of the gases flowing through the secondary nozzle.

* * * * *